(12) United States Patent
Bouzaglo

(10) Patent No.: US 8,786,465 B2
(45) Date of Patent: Jul. 22, 2014

(54) PARKING MANAGEMENT AND BILLING

(76) Inventor: Baruch Bouzaglo, Paris (FR)

( * ) Notice: Subject to any disclaimer, the term of this patent is extended or adjusted under 35 U.S.C. 154(b) by 130 days.

(21) Appl. No.: 13/295,093

(22) Filed: Nov. 13, 2011

(65) Prior Publication Data

US 2012/0286972 A1   Nov. 15, 2012

Related U.S. Application Data

(63) Continuation-in-part of application No. PCT/IB2010/052096, filed on May 11, 2010.

(60) Provisional application No. 61/177,288, filed on May 12, 2009.

(51) Int. Cl.
*G08G 1/14* (2006.01)

(52) U.S. Cl.
USPC ............................ 340/932.2; 705/13

(58) Field of Classification Search
USPC .............. 340/932.2; 701/423; 705/1.1, 13
See application file for complete search history.

(56) References Cited

U.S. PATENT DOCUMENTS

| | | | |
|---|---|---|---|
| 2004/0212519 A1* | 10/2004 | Nelson et al. | 340/932.2 |
| 2011/0109480 A1* | 5/2011 | Huijnen et al. | 340/932.2 |
| 2011/0270669 A1* | 11/2011 | Rowe et al. | 705/14.37 |
| 2011/0309953 A1* | 12/2011 | Petite et al. | 340/932.2 |
| 2012/0098677 A1* | 4/2012 | Geelen | 340/932.2 |

* cited by examiner

*Primary Examiner* — Brent Swarthout
(74) *Attorney, Agent, or Firm* — Smith Risley Tempel Santos LLC; Gregory Scott Smith

(57) ABSTRACT

A parking management system including a server, a plurality of mobile parking management devices mounted in cars, an plurality of parking area parking control devices mounted in a parking areas, and a plurality of portable parking control devices used by parking attendants, all communicating via one or more wireless networks. Upon request, the server provides a mobile parking management device with information pertaining to parking availability and to commercial establishments offering parking payment refunds. Upon request a commercial establishments sends a parking payment refund to the server. Upon request the server bills the account associated with the mobile parking management device according to the parking fee and period of parking.

3 Claims, 6 Drawing Sheets

PARKING MANAGEMENT AND BILLING

CROSS-REFERENCE TO RELATED APPLICATIONS

The present application is being filed in the United States Patent Office as bypass application under 35 USC 111 and as described in MPEP 1895, and as a continuation-in-part application, claims priority to the International Application that was filed on May 11, 2010 and assigned International Application Number PCT/IB2010/052096 and published as WO 2010/131206 A2, which application claims priority to the U.S. Provisional application for patent that was filed on May 12, 2009 and assigned Ser. No. 61/177,288, both of which are incorporated herein by reference.

FIELD AND BACKGROUND OF THE INVENTION

The present invention relates to parking management and billing systems and methods and, more particularly, but not exclusively to networked parking management and billing system and method.

Current parking management and billing methods and systems are based on "stand-alone" technology. In this respect, the term stand-alone technology refers to parking instruments that are operative irrespectively of each other or any central control. Such parking instruments are: coin-operated or token-operated parking meters, scratch-cards, parking payment stations issuing parking receipts, prepaid electronic parking payment devices, etc.

However, current parking management systems do not support varying parking fees.

There is thus a widely recognized need for, and it would be highly advantageous to have, a networked parking management and billing system and method devoid of the above limitations.

SUMMARY OF THE INVENTION

According to one aspect of the present invention there is provided a mobile parking management device including: a processor, a memory module connected to the processor, a user interface module connected to the processor, and a first communication interface module connected to the processor; wherein the processor is operative to communicate, via the first communication interface module, and a first network, with a remote server; and wherein the processor is additionally operative to send a parking management device identification data to the remote server; and wherein the processor is additionally operative to report parking status to the remote server.

According to another aspect of the present invention there is provided a mobile parking management device additionally including a second communication interface module connected to the processor; wherein the processor is operative to communicate, via the second communication interface module, and a second network, with a parking area control device; and wherein the processor is additionally operative to receive a parking area identification data from the parking area control device; and wherein the processor is additionally operative to report the parking area identification data to the remote server.

According to yet another aspect of the present invention there is provided a mobile parking management device wherein the processor is additionally operative to receive, from the remote server, a parking permit code associated with the parking management device identification data and the parking area identification data.

According to still another aspect of the present invention there is provided a parking management server including: a processor, a memory module connected to the processor, a first communication interface module connected to the processor; wherein the processor is operative to communicate, via the first communication interface module, and a first network, with a parking management device mounted in a parked vehicle; wherein the processor is additionally operative to receive a parking management device identification data from the parking management device; and wherein the processor is additionally operative receive parking status from the parking management device.

Further according to another aspect of the present invention there is provided a parking management server wherein the processor is additionally operative to send, to the parking management device: a parking permit code associated with the parking management device identification data, and the parking area identification data.

Still further according to another aspect of the present invention there is provided a portable parking control device comprising: a processor; a memory module connected to said processor; a user interface module connected to said processor; and a first communication interface module connected to said processor; wherein said processor is operative to communicate, via said first communication interface module, and a first network, with a remote server; wherein said processor is additionally operative to send a parking management device identification data to said remote server; and wherein said processor is additionally operative to report parking status to said remote server.

Even further according to another aspect of the present invention there is provided a mobile parking management device additionally including an interface for communicating with a portable personal identification device that identifies a billing account of a user of the mobile parking management device.

Additionally, according to another aspect of the present invention there is provided a parking area control devices including a processor, a memory module connected to the processor, a communication interface module connected to the processor, a proximity sensing device for sensing the presence of a car parked in a parking space, where the processor is operative to communicate to a remote server, via said communication interface module, the occupancy status of the parking place.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extend necessary or inherent in the processes themselves, no particular order to steps or stages of methods and processes described in this disclosure, including the figures, is intended or implied. In many cases the order of process steps may varied without changing the purpose or effect of the methods described.

Implementation of the method and system of the present invention involves performing or completing certain selected tasks or steps manually, automatically, or any combination thereof. Moreover, according to actual instrumentation and equipment of preferred embodiments of the method and system of the present invention, several selected steps could be implemented by hardware or by software on any operating system of any firmware or any combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

Figure 1:
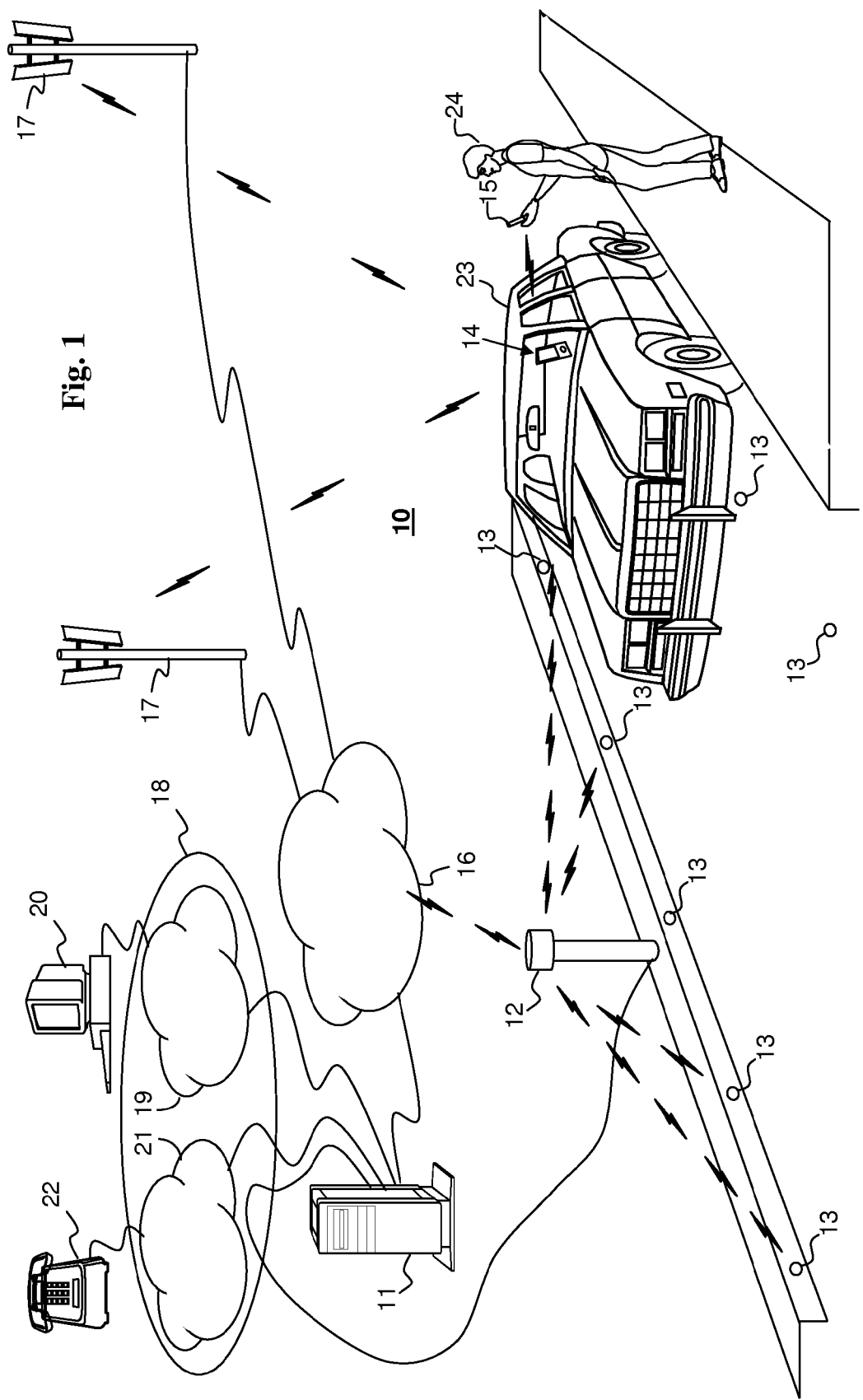
FIG. 1 is a simplified illustration of a metropolitan car parking system according to a preferred embodiment of the present invention.

The principles and operation of a system and a method for managing and billing metropolitan car parking according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

It is also appreciated that the concept of managing and billing metropolitan car parking described herein by example, also applies for other types of car parking.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

Reference is now made to FIG. 1, which is a simplified illustration of a metropolitan car parking system 10, according to a preferred embodiment of the present invention.

As shown in FIG. 1, the metropolitan car parking system 10 preferably includes the following elements:

a server 11, preferably a network server;
a plurality of parking area control devices 12 and 13;
a plurality of parking management devices 14; and
a plurality of portable parking control devices 15.

The server 11 is preferably connected to a communication network 16. The network 16 is preferably, at least partially, a wireless network. The wireless network is preferably a public land mobile network (such as a cellular network GSM network 3G network, 4G network, LTE, etc.), or a metropolitan wireless access network, such as WiMAX (IEEE802.16). Typically, the network 16 contains at least one base station 17. The base station 17 provides radio communication with the parking management device 14 and optionally also with the parking area control devices 12 and/or with the portable parking control devices 15.

The server 11 is preferably connected to a communication network 18. The network 16 is preferably a public communication network. Preferably, The network 16 is a data communication network 19, such as the Internet, connecting the server 11 to data terminals and/or computers 20; and/or a telephone communication network 21 connecting the server 11 to telephone terminals 22.

The parking area control devices 12 and/or 13 are typically distributed within parking areas, such as streets and parking lots (e.g. car parks) where parking is controlled. The parking area control devices 12 are and/or 13 preferably equipped with proximity sensors that enable the detection if a car is parked in a parking space or that the parking space is available for parking. The parking area control devices 12 and/or 13 preferably communicate with the server 11 via a communication network such as communication network 16 and/or a communication network 18. Preferably, parking area control devices 13 operate as car sensing devices, communicate with parking area control devices 12, which communicate with the server 11.

The parking management devices 14 are mounted in vehicles, particularly in parking vehicles, such as car 23.

The portable parking control devices 15 are typically carried by parking attendants 24.

The parking area control devices 12 and/or 13 preferably includes a processor and a memory module connected to the processor,
a first wireless communication interface module connected to the processor for communicating with the server 11;
a second wireless communication interface module connected to the processor for communicating with parking management devices 14 and/or portable parking control devices 15; and
a proximity sensing device operative to sense the presence of a car parked in a particular parking space.

Thus, the parking area control devices 12 and/or 13 are therefore operative to communicate to the remote server 11 the occupancy status of a parking place.

Preferably, the parking area control devices 12 and/or 13 communicate via a wireless network with the parking management devices 14, when in the specific parking management device 14 is within the communication range of the specific parking area control device 12. Therefore, the parking area control devices 12 preferably use a wireless local area network, such as WiFi (IEEE802.11), having a limited range.

The parking area control devices 12 and/or 13 are preferably powered by electric batteries to eliminate the need to connect the parking area control devices 12 and/or 13 to electric network. Preferably, the batteries are rechargeable batteries and the parking area control devices 12 and/or 13 include solar cells to charge the rechargeable batteries. Preferably, The parking area control devices 13 are installed in the sidewalk or in the road according to marked parking spaces, as shown in FIG. 1.

Preferably, the portable parking control devices 15 communicate via a wireless network with the parking management devices 14, when in the specific parking management device 14 is within the communication range of the specific portable parking control devices 15. Therefore, the portable parking control devices 15 preferably use a wireless personal area network, such as Bluetooth (IEEE802.15.1), RFID, secure NFC, etc., having a short range.

It is appreciated that the three networks described above (connecting the parking management device 14 with the server 11, with the parking area control devices 12 and 13, and with the portable parking control device 15) can use the same wireless technology (e.g. 3G, 4G, LTE, WiMAX), by using high, medium and low transmission power, respectively, to control the range of the communication.

Figure 2:
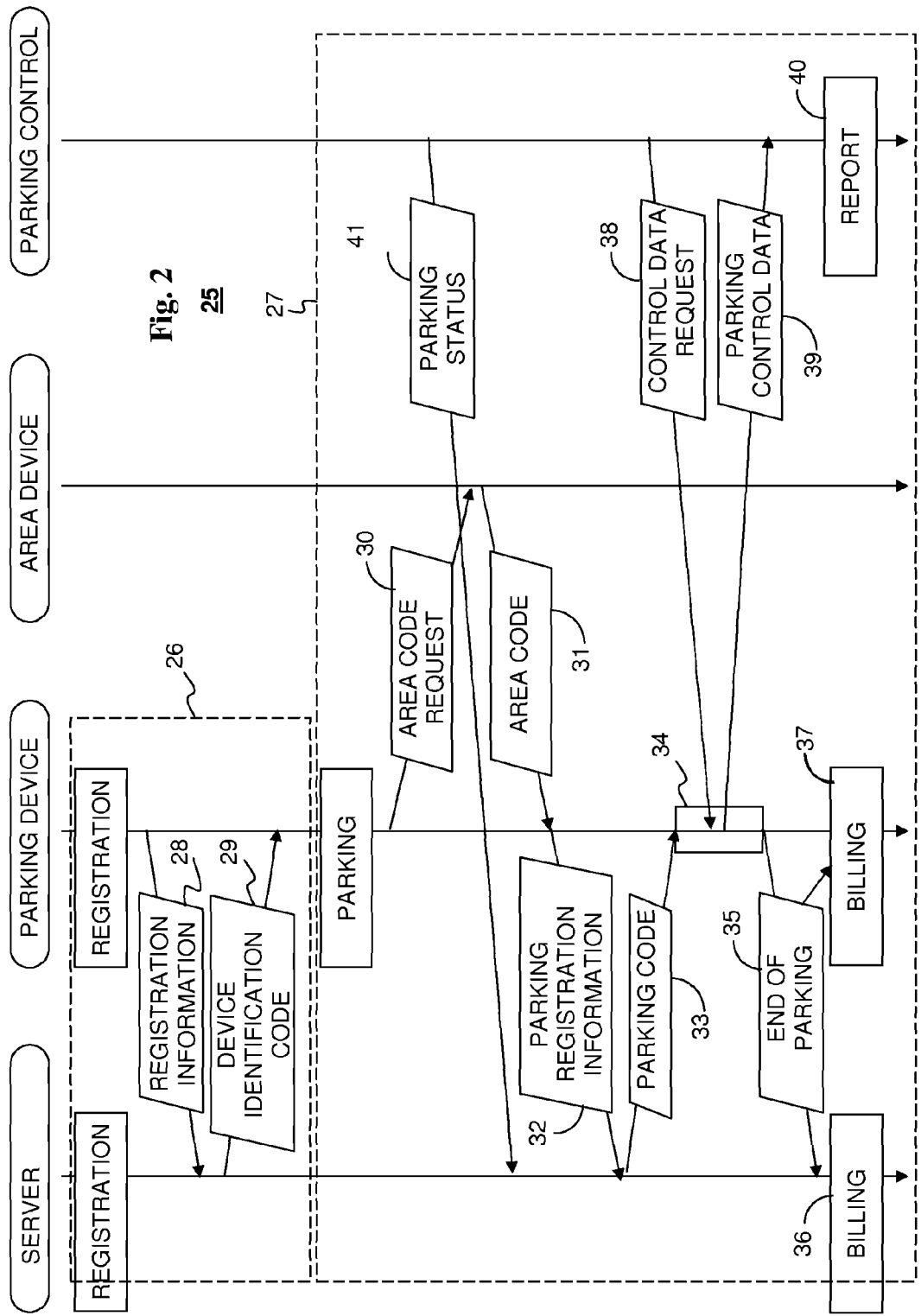
FIG. 2 is a simplified flow chart of a parking management process within the metropolitan car parking system.

Reference is now made to FIG. 2, which is a simplified flow chart of a parking management process 25 within the metropolitan car parking system 10, according to a preferred embodiment of the present invention.

As shown in FIG. 2 parking management process 25 preferably starts with a registration sub-process 26. Preferably followed by repeated parking sub-processes 27 (of which only one is shown in FIG. 2).

Preferably, as a part of the registration process 26, a user, preferably a driver, registers a parking management device 14 at the server 11. Preferably, the user uses the parking management device 14 to send to the server 11 registration information 28. In response to the registration information 28 the server 11 sends to the parking management device 14 device identification code 29 uniquely identifying the parking management device 14. Typically, the registration information 28 includes account memberships and/or billing information enabling the server to charge parking fee to an account of the user, such as a bank account or a credit card account.

Alternatively, the user buys a prepaid parking permit and charges the parking management device 14. Preferably, by entering a prepaying code uniquely associated with the prepaid parking permit into the parking management device 14. The prepaying code can serve as the device identification code, thus the registration sub-process may not be mandatory. It is appreciated that the prepaid arrangement may be based on a prepaid total parking time (e.g. parking minutes), with or without a limitation on the validity period, or, alternatively, a flat rate for a limited period (e.g. one month).

The parking sub-process 27 preferably starts with the parking management device 14 sending an area code request 30 to the nearest area control device 12. In response to the area code request 30 the area control device 12 sends to the parking management device 14 an area code 31. Preferably, the area code 31 is uniquely identified with the area associated with the specific area control device 12. Preferably, the area code 31 is also uniquely identified with the specific parking management device 14.

After receiving the area code 31 the parking management device 14. sends parking registration information 32 to the server 11. The parking registration information 32 preferably contains the device identification code 29 (or the prepayment code) and the area code 31. In response to the parking registration information 32 the server 11 sends to the parking management device 14 a parking code 33. The parking code is preferably uniquely associated with the parking registration information 32, for example, with the device identification code 29 (or the prepayment code) and the area code 31, and optionally with the date and time of the parking request.

At the end of the parking period 34 the user uses the parking management device 14 to send an end of parking notification 35 to the server 11. The server 11 then process billing 36 of the user's account according to the appropriate parking fee. Alternatively, such as in the case of a prepaid parking permit, the parking management device 14 processes the billing 37 by deducting the appropriate payment fee from the remainder of the prepayment. Preferably, the parking management device 14 processes the billing 37 in accordance with fee instruction included in the parking code 33 information.

It is appreciated that the server 11 can be programmed to associate different parking fees with different locations and/ or with different time of day, day of the week, holidays, etc. Optionally, the server 11 can calculate different parking fee according to the parking period. For example: a short parking period (e.g. less than 10 minutes) can be free of charge; a long parking period (e.g. over three hours) can have a lower, or a much higher, per hour fee. Preferably, the server 11 sends the parking fee details to the parking management device 14, preferably as a part of the parking code 33 information, preferably to be presented to the user by the parking management device 14.

As the parking attendant 24 passes along a parked vehicle 23 the parking attendant 24 uses the portable parking control devices 15 to send a control data request to the parking management device 14 in the vehicle 23. In response to the control data 38 the parking management device 14 sends a parking control data 39 to the portable parking control devices 15. Preferably, the parking control data 39 contains the parking code 33. Preferably, the portable parking control devices 15 can authenticate the validity of the parking control data 39 according to the parking code 33.

If parking control data 39 is not received, or if the parking control data 39 is invalid, the parking attendant 24 preferably uses the portable parking control devices 15 to issue a parking fine report 40.

Preferably, if the parking attendant 24 passes by an unused parking space the parking attendant 24 can use the portable parking control devices 15 to report the available parking space (41) to the server 11.

Figure 3:
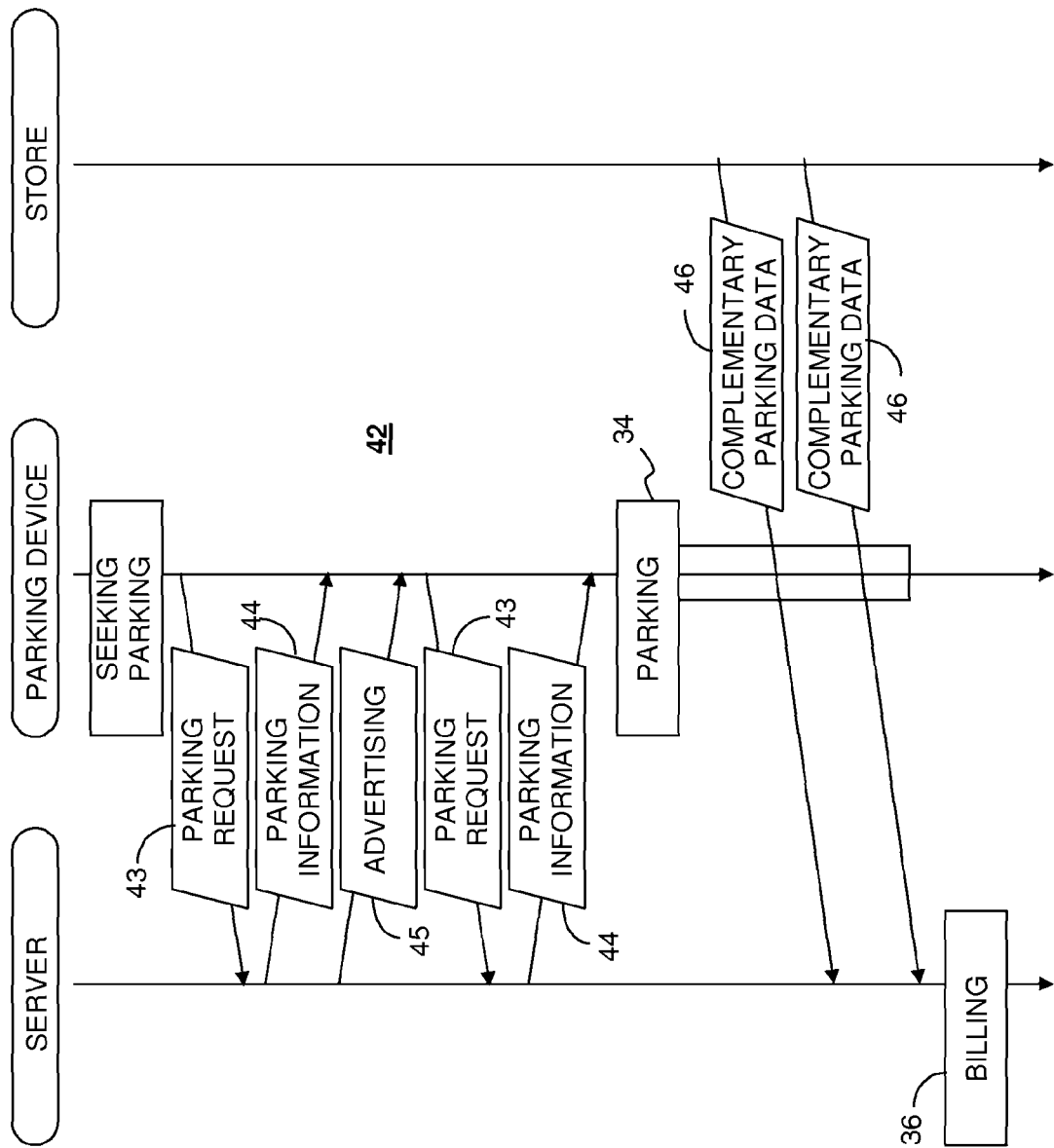
FIG. 3 is a simplified flow chart of an advertising process within the metropolitan car parking system.

Reference is now made to FIG. 3, which is a simplified flow chart of an advertising process 42 within the metropolitan car parking system 10, according to a preferred embodiment of the present invention.

The advertising process 42 preferably starts when a user, preferably the driver of a vehicle, approaches the area where the vehicle should be parked. The user then uses the parking management device 14 to send a parking request 43 to the server 11. The parking request 43 preferably contains information regarding the current location of the vehicle. Preferably, the current location is acquired from a near-by parking area control device 12. In response to the parking request 43, the server 11 preferably sends parking information 44, preferably detailing locations of available parking space.

Following the parking information 44 the server 11 preferably sends advertising 45 preferably pertaining to the target locality. Particularly, the server 11 preferably sends advertising pertaining to stores and other commercial establishments that offer at least partial parking payment refund.

The process of sending parking request 43 and receiving parking information 44 and optionally also advertising 45 may repeat until the user selects the parking space.

When the user visits a store or any other type of commercial establishment offering parking payment refund the user can request parking payment refund. The store (any other type of commercial establishment) can then use a telephone, a data terminal or a computer, such as telephone 22 or data terminal/computer 20 of FIG. 1 to communicate with the server 11. Preferably, the store sends a complementary parking data 46 to the server 11. If the telephone 22 is used the complementary parking data 46 is conveyed to the server 11 preferably via an interactive voice response system (IVR) and/or a smartphone application. The server then processes the billing 36 in accordance with the complementary parking data 46. The complementary parking data 46 preferably contains an identification of the store, an identification of the parking management device 14 and the value of the refund (not necessarily the entire parking payment).

It is appreciated that location information can be acquired using triangulation methods based on signals received from two or more base stations 17, or from two or more by parking area control devices 12, or from a global positioning system (GPS).

Figure 4:
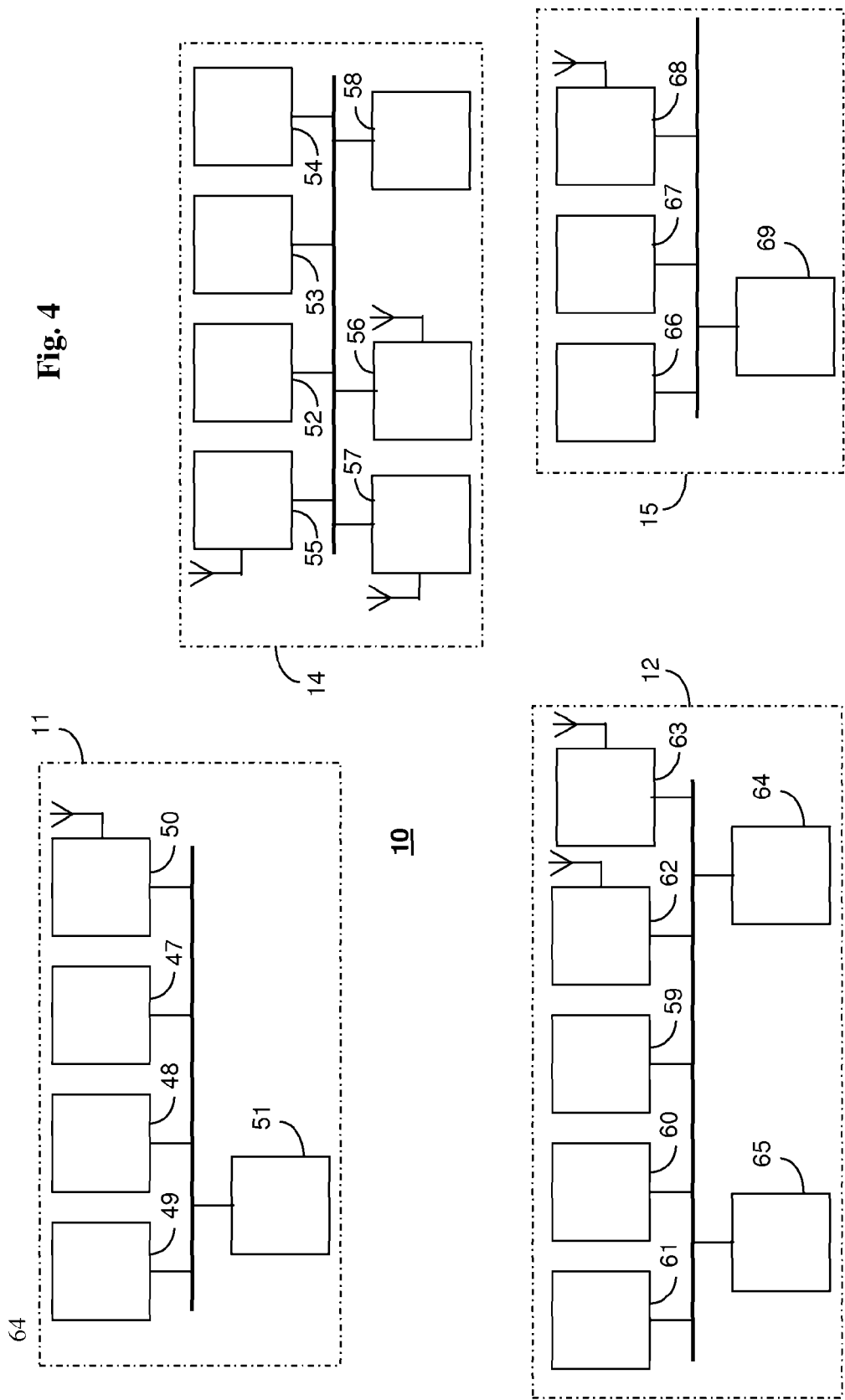
FIG. 4 is a simplified block diagram of the metropolitan car parking system 10.

Reference is now made to FIG. 4, which is a simplified block diagram of the metropolitan car parking system 10 according to a preferred embodiment of the present invention.

The metropolitan car parking system 10 shown in FIG. 4 preferably includes the following elements:
the server 11, preferably a network server;
the parking area control device 12;
the parking management device 14; and
the portable parking control device 15.
The server 11 preferably includes:
a processor 47,
a memory and/or a storage device 48;
a user interface 49;
a wireless network interface 50, and
a fixed network interface 51.
Preferably, the wireless network interface provides communication with the parking management device 14; and optionally also with the parking area control device 12 and/or the portable parking control device 15.

The parking management device 14 preferably includes:
a processor 52,
a memory and/or a storage device 53, optionally including a portable storage device such as a smart card,
a user interface 54,
three wireless network interfaces 55, 56 and 57 providing metropolitan (e.g. 4G, WiMAX, etc.), local (e.g. WiFi) and short range communications (e.g. Bluetooth, and/or Zigbee, and/or RFID and/or secure NFC (near field communication)) respectively, and
power source 58, such as a battery or a power supply connected to the car battery.
It is appreciated that the three network interfaces can be implemented as a single network interface.
the parking area control device 12 (or 13) preferably includes:
a processor 59,
a memory and/or a storage device 60, optionally including a portable storage device such as a smart card,
a user interface 61,
a wireless network interfaces 62 providing short range communication (e.g. Bluetooth) and optionally also local and metropolitan communication,
a wireless network interfaces 63 providing long range and/or metropolitan communication (such as Internet, 3G, 4G, WiMAX, etc.) and optionally also local communication,
optionally, a sensing device 64 for detecting the presence of a car parked in a particular parking place; and
power source 65, such as a battery.
The portable parking control device 15 preferably containing:
a processor 66,
a memory and/or a storage device 67,
a wireless network interfaces 68 providing local communication (e.g. using 4G, WiFi, or short-range communications such as Bluetooth, Zigbee, RFID or secure NFC) and optionally also short range and metropolitan communication.
power source 69, such as a power supply.

Figure 5:
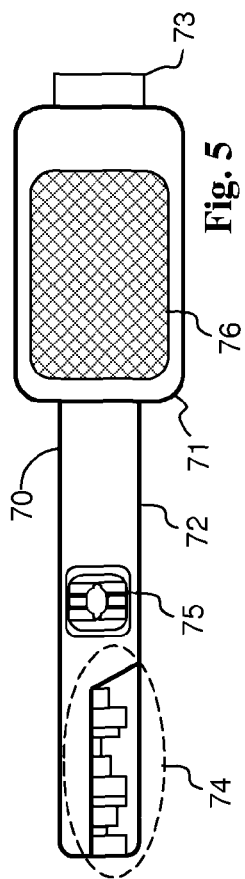
FIG. 5 is a simplified illustration of a smart key.

Reference is now made to FIG. 5, which is a simplified illustration of a smart key 70 according to a preferred embodiment of the present invention.

As seen in FIG. 5, the smart key 70 preferably includes a handle part 71, an inserted part 72 and a USB connector 73. The USB connector 73 is preferably mounted on the handle part 71, opposite to the inserted part 72. The inserted part 72 preferably includes a mechanical key code part 74 and a smartcard chip 75, preferably electronically connected to the handle part 71. A biometric authentication sensor 76 is preferably mounted on the handle part 71. Preferably, the biometric authentication sensor 76 is a finger-print sensor.

Figure 6:
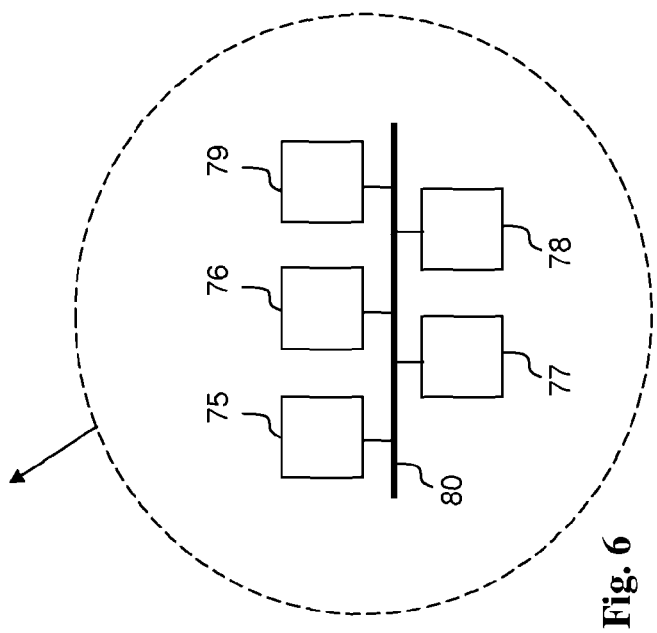
FIG. 6 is a simplified block diagram of the smart key of FIG. 5.

Reference is now made to FIG. 6, which is a simplified block diagram of the smart key 70 according to a preferred embodiment of the present invention.

The smart key 70 is a portable personal identification device. As seen in FIG. 6, the smart key 70 preferably includes a processor 77, flash memory 78, USB driver 79 preferably connected to the USB connector 73, the smart card chip 75 and the biometric authentication sensor 76, (finger-print, iris recognition, face recognition, etc.) all preferably connected over a bus 80. Preferably, the authentication data is stored in the smart card chip 75.

Figure 7A:
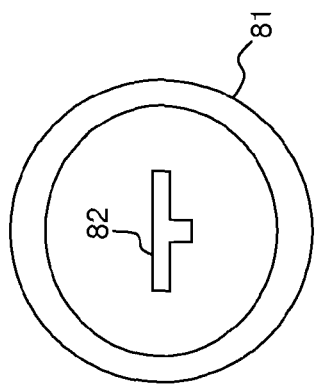
FIGS. 7A and 7B are simplified illustrations of a front view and a side cut, respectively, of a smart lock compatible with the smart key of FIGS. 5 and 6
Figure 7B:
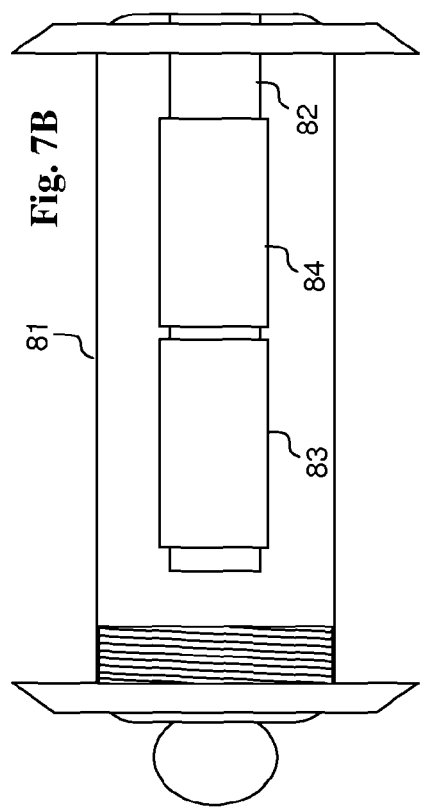

Reference is now made to FIGS. 7A and 7B, which are simplified illustrations of a front view and a side cut, respectively, of a smart lock 81 according to a preferred embodiment of the present invention.

As seen in FIG. 7A, the smart lock 81 includes a receptacle part 82 into which the inserted part 72 of the smart key 70 can be inserted.

As seen in FIG. 7B, the smart lock 81 includes a mechanical part 83 and an electronic and electrical part 84 preferably mounted on the receptacle part 82.

The mechanical part 83 is preferably operative to decode the mechanical coding of the mechanical key code part 74 and to enable the user to open and/or to lock the smart lock 81 by rotating the smart key 70 inside the receptacle part 82. This is an optional fallback use of the smart lock 81 and smart key 70, for example, when there is a loss of electricity or another electrical or electronic failure.

The electronic and electrical part 84 is operative to communicate with the smart-card chip 75 of the smart key 70 when the inserted part 72 is inserted into the receptacle part 82 and to electrically rotate open or close the smart lock 81. As seen in FIG. 5, the smart-card chip 75 communicates with the electronic and electrical part 84 via electrical connectors, however, it is also possible to use wireless connectivity, such as infra-red communication technology or RF communication technology, such as RFID or secure NFC.

Preferably, the smart lock 81 provides electrical power to the smart key 70 via the connectors of the smart-card chip 75. When power is applied to the smart key 70 the processor 77 uses the biometric authentication sensor 76 to authenticate the user holding the handle part 71 and touching the biometric authentication sensor 76. Only if the user is authenticated the processor 77 instructs the smart-card chip 75 to instruct the electronic and electrical part 84 to lock or unlock the smart lock 81.

It is appreciated that the processor 77 can be the processor of the smart-card chip 75.

While the smart lock 81 shown in FIG. 7B is shaped for a door, the smart lock 81 can be shaped for a car or other uses of a lock. Additionally, the smart key 70 can be used for applications requiring user authentications, such as physical access control, computer access control, attendance monitoring, electronic purse and electronic payments, etc.

Particularly, the smart-card chip 75 of the smart key 70 can be used for applications of electronic purse and electronic payments such as traffic management, including toll road payments and parking payments. Preferably, the smart key 70 can be inserted into the parking management device 14 of FIG. 1. When inserted into the parking management device 14, the smart key 70 identifies the user via the biometric authentication sensor 76 and optionally also executes payment using pre-paid account stored in the smart-card chip 75.

Similarly, the USB connector 73 of the smart key 70 can be inserted into a USB connector of a computing device such as a computer, for example, to make the flash memory 78, or the contents of the flash memory 78, available to the computing device. When power is applied to the smart key 70 via the USB connector 73, the processor 77 uses the biometric authentication sensor 76 to authenticate the user holding the handle part 71 and touching the biometric authentication sensor 76. Only if the user is authenticated the processor 77 instructs the USB driver 79 to provide communications with the computing device and/or to enable access to the flash memory 78.

Preferably, the flash memory 78 contains an encryption-decryption software program. This software program preferably executes the following tasks:

If, simultaneously, an encrypted file, a decryption key and a user identification code are presented to the flash memory, and a user is authenticated via the biometric authentication sensor 76 to be associated with the user identification code, the software program preferably decrypts the file and present it at the USB connector 73, for downloading into the computing device.

If, simultaneously, a file and a user identification code are presented to the flash memory, and a user is authenticated (for example by means of fingerprint, iris recognition, face recognition, etc.) via the biometric authentication sensor 76 to be associated with the user identification code, the software program preferably encrypts the file and presents it, with a decryption key, at the USB connector 73, for downloading into the computing device.

Figure 8:
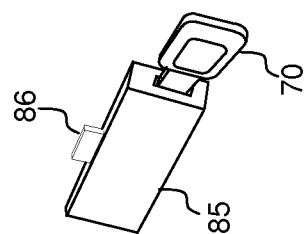
FIG. 8 is a simplified illustration of a lock adapter for use with a parking management device.
Figure 9:
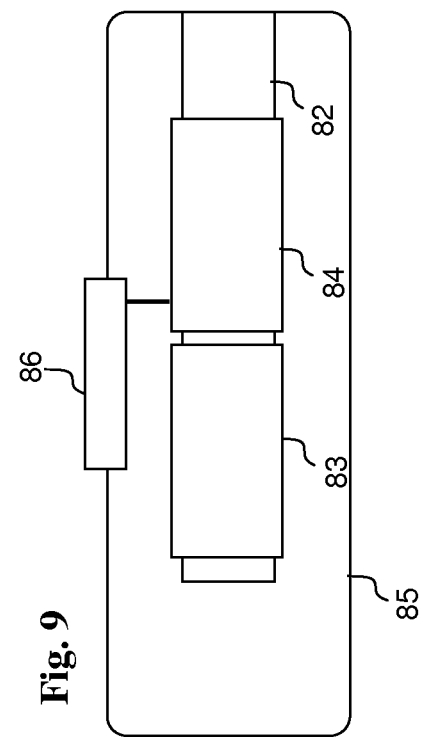
FIG. 9 is a simplified block diagram of the lock adapter.

Reference is now made to FIG. 8, which is a simplified illustration of a lock adapter 85 and to FIG. 9, which is a simplified block diagram of the lock adapter 85 according to a preferred embodiment of the present invention.

As shown in FIGS. 8 and 9, the lock adapter 85 is similar the smart lock 81 as it is equipped to interface with the smart key 70. However, the lock adapter 85 also includes an interface 86 to a computational device such as the parking management device 14.

Figure 10:
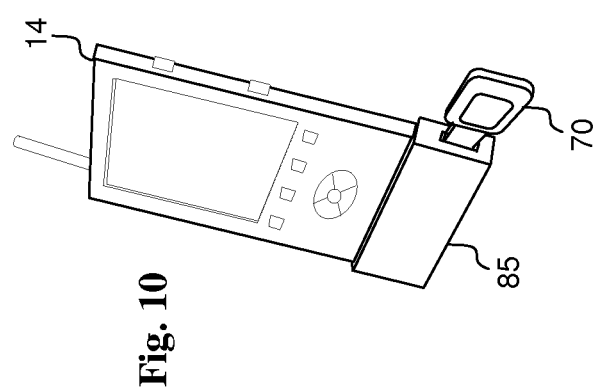
FIG. 10 is a simplified illustration of the lock adapter connected to a parking management device with a smart key inserted.

Reference is now made to FIG. 10, which is a simplified illustration of the lock adapter 85 connected to a computational device such as the parking management device 14 with the smart key 70 inserted into the lock adapter 85, according to a preferred embodiment of the present invention. The lock adapter 85 is therefore operative as an interface between the parking management device 14 and the smart key 70.

It is appreciated that alternatively, the smart key 70 can be connected to the parking management device 14 directly by means of the USB connector 73 or by means of any short-range communication such as RFID, NFC, etc.

It is appreciated that the smart key 70 identifies the user to the mobile parking management device 14, and particularly the billing account of the user.

It is expected that during the life of this patent many relevant communication technologies will be developed, and the scope of the terms herein, such as WiFi, WiMAX, 3G, 4G, secure NFC, RFID, Zigbee, and Bluetooth, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A device for managing car parking, the device comprising:
   a processor;
   a memory module connected to said processor;
   a user interface module connected to said processor;
   a first communication interface module connected to said processor; and
   a second communication interface module connected to said processor;
   wherein said processor is operative to communicate, via said first communication interface module, and a first network, with a remote server;
   wherein said processor is additionally operative to send a parking management device identification data to said remote server;
   wherein said processor is additionally operative to report parking status to said remote server;
   wherein said processor is operative to communicate, via said second communication interface module, and a second network, with a parking area control device;

wherein said processor is additionally operative to receive a parking area identification data from said parking area control device; and wherein said processor is additionally operative to report said parking area identification data to said remote server; and wherein said processor is additionally operative to receive, from said remote server, a parking permit code associated with said parking management device identification data and said parking area identification data.

2. A device according to claim 1 additionally comprising:

an interface operative to communicate with a portable personal identification device;

wherein said portable personal identification device is operative to identify an account of a user of said mobile parking management device.

3. A parking management server comprising:

a processor;

a memory module connected to said processor;

a first communication interface module connected to said processor;

wherein said processor is operative to communicate, via said first communication interface module and a first network, with a parking management device mounted in a parked vehicle in a parking area;

wherein said processor is additionally operative to receive a parking management device identification data from said parking management device;

wherein said processor is additionally operative to receive parking status from said parking management device;

wherein said processor is additionally operative to report parking status to said remote server; and wherein said processor is additionally operative to send to said parking management device: a parking permit code associated with said parking management device identification data, and identification data of said parking area.

* * * * *